US006351741B1

(12) United States Patent
Flenniken

(10) Patent No.: US 6,351,741 B1

(45) Date of Patent: Feb. 26, 2002

(54) METHOD OF LOCATING A FILE LINKED TO A DOCUMENT IN A RELOCATED DOCUMENT DIRECTORY STRUCTURE

(75) Inventor: Steve L. Flenniken, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/306,896

(22) Filed: May 7, 1999

(51) Int. Cl.[7] ............................ G06F 17/30; G06F 7/00

(52) U.S. Cl. ............................................................ 707/2

(58) Field of Search .......................... 707/1, 2, 10, 202, 707/203, 205, 501.1, 513

(56) References Cited

U.S. PATENT DOCUMENTS 5,721,919 A * 2/1998 Morel et al. ................ 395/619
5,752,022 A * 5/1998 Chiu et al. .................. 395/610
5,832,527 A * 11/1998 Kawaguchi ................. 707/205
5,973,692 A * 10/1999 Knowlton et al. .......... 345/348
6,052,486 A * 4/2000 Knowlton et al. .......... 382/232
6,148,311 A * 11/2000 Wishnie et al. ............. 707/513
6,167,453 A * 12/2000 Becker et al. .............. 709/245
6,230,168 B1 * 5/2001 Unger et al. ................ 707/501
6,256,631 B1 * 7/2001 Malcolm ..................... 707/10

* cited by examiner

*Primary Examiner*—Jack Choules
*Assistant Examiner*—Linh Pham
(74) *Attorney, Agent, or Firm*—Fish & Richardson P.C.

(57) ABSTRACT

A mechanism for locating a linked file is described. The mechanism retrieves a reference to a linked file linked to a document. The reference specifies an absolute pathname. The mechanism parses the absolute pathname into a plurality of relative pathnames and appends a first one of the relative pathnames to a current directory specification for the document to produce a new absolute pathname. Subsequent ones of the plurality of relative pathnames are appended to the current directory specification until the new absolute pathname points to the linked file.

8 Claims, 2 Drawing Sheets

FROM 14
PARSE ABSOLUTE PATHNAME INTO RELATIVE PATHNAMES (20)
16
LOWEST LEVEL = CURRENT LEVEL (21)
APPEND CURRENT LEVEL RELATIVE PATHNAME TO DIRECTORY SPEC. TO PRODUCE NEW ABSOLUTE PATHNAME (22)
24 NEW ABSOLUTE PATHNAME POINTS TO FILE ?
YES
REPLACE ABSOLUTE PATHNAME WITH NEW ABSOLUTE PATHNAME (26)
GO TO 18
NO
22 CURRENT LEVEL = NEXT HIGHER LEVEL
RETURN TO 22

METHOD OF LOCATING A FILE LINKED TO A DOCUMENT IN A RELOCATED DOCUMENT DIRECTORY STRUCTURE

BACKGROUND OF THE INVENTION

The present invention relates to constructing pathnames for locating files.

One common way to organize files is with a directory structure that allows files or directories to reside within other directories. When a directory resides within another directory, the residing directory is referred to as a "subdirectory". A file ultimately resides in a parent directory. The file's parent directory may, in turn, have a parent directory, and so on, thus creating a hierarchy of directories. To access a particular file, each of the parent directories in a chain from a starting or "root," directory are named in a string, along with the file's name. The resulting string is referred to as a "pathname".

An absolute pathname uniquely identifies any file in a specific file system without requiring further information.

Consider as an example a file "fileX" with an absolute pathname "HardDrive:\directoryA\directoryB\directoryC\fileX". The directory "directoryA" is the root directory, which is always given as a starting directory in an absolute pathname.

Another form of pathname is a relative pathname, which identifies a file by using a relative path and a reference point such as a "current" or starting directory (other than the root directory). Using the same example as above, and assuming the current directory is "directory C", a relative path to be used to access "fileX" is "\directoryC\fileX".

It is quite common for documents having imported files to specify links to those files. In the case of a document which references another file such as an image file, the referencing document will include either an absolute or a relative pathname for accessing the image file. If a user moves the entire directory hierarchy associated with the document to a new location, the linked file's absolute pathname (if specified) continues to point to the old location. When the document is opened, the associated file will be missing, i.e., not at the specified location. Consequently, user input is required to locate the missing file.

It would be relatively straightforward to locate the linked file if its location were specified by a relative pathname, but many applications do not maintain relative pathnames as links. Some applications, such as applications which handle legacy data, do not support relative pathnames. These applications record the absolute pathname of the referenced file, but not that of the referencing document.

Even when relative pathnames are supported, there are various drawbacks associated with their use. For example, when the directory structure is changed instead of merely moved or the document and its associated linked file are not moved together, a relative pathname may not provide sufficient information to reconstruct the link.

One prior link repairing technique employed by applications which use absolute pathnames for linking tries to find a missing linked file in the referencing document's directory and goes no further. That is, any further attempts to locate a missing linked file require user involvement.

Another prior approach to repairing absolute pathname links requires user involvement and is site-specific, i.e., it can repair links for files which have been moved to a different location at the same site.

SUMMARY

In one aspect of the invention, a linked file is located by retrieving a reference to a linked file linked to a document. The reference specifies an original absolute pathname.

The absolute pathname is parsed into a plurality of relative pathnames and a first one of the relative pathnames is appended to a current directory specification for the document to produce a new absolute pathname. Subsequent ones of the plurality of relative pathnames are appended to the current directory specification until the new absolute pathname points to the linked file.

Embodiments of the invention may include one or more of the following features.

The linked file may reside in the same directory structure as the document to which the linked file is linked.

The reference may be stored in the document to which the linked file is linked and the original absolute pathname may be replaced with the new absolute pathname.

The linked file locating mechanism of the invention offers several advantages. It allows an application to locate automatically (i.e., without user involvement) a file referenced by a document when the directory structure in which both the file and the document reside has been moved to a different location. The mechanism is therefore compatible with applications that cannot or do not support relative pathnames as links.

BRIEF DESCRIPTION OF THE DRAWINGS

The above features and advantages of the present invention will become more apparent from the following detailed description taken in conjunction with the accompanying drawings, in which.

DESCRIPTION

Figure 1:
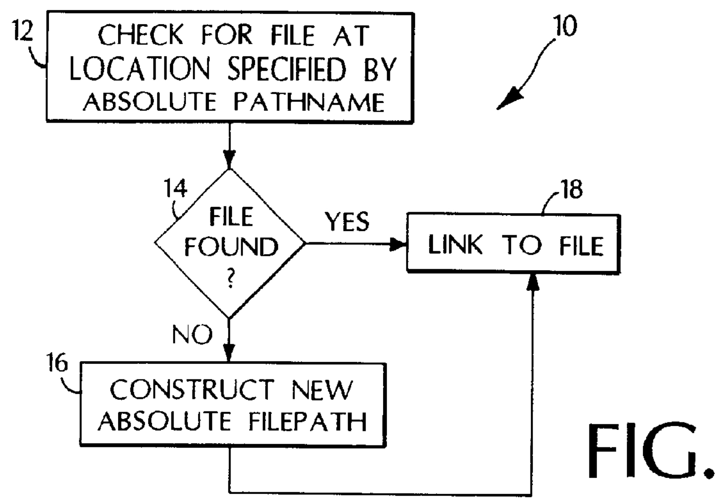
FIG. 1 is a flow diagram of a process for detecting and repairing broken links.

As shown in FIG. 1, a process 10 for detecting and repairing a broken link to a file referenced by a document whose directory structure has been moved from one location to another is shown. The process 10 attempts to locate a file at a location corresponding to an absolute pathname (original absolute pathname) stored in association with the document (step 12). The absolute pathname may be specified in the document itself or stored in some external location. The process retrieves the absolute pathname from the document or an external source. If the process 10 determines that the specified absolute pathname is no longer valid, i.e., the file is no longer stored at that location (step 14), the process 10 constructs a new absolute pathname corresponding to the file's present location (step 16). If the process 10 determines (at step 14) that the specified absolute pathname is valid, the process links to the file for file access (step 18).

Figure 2:
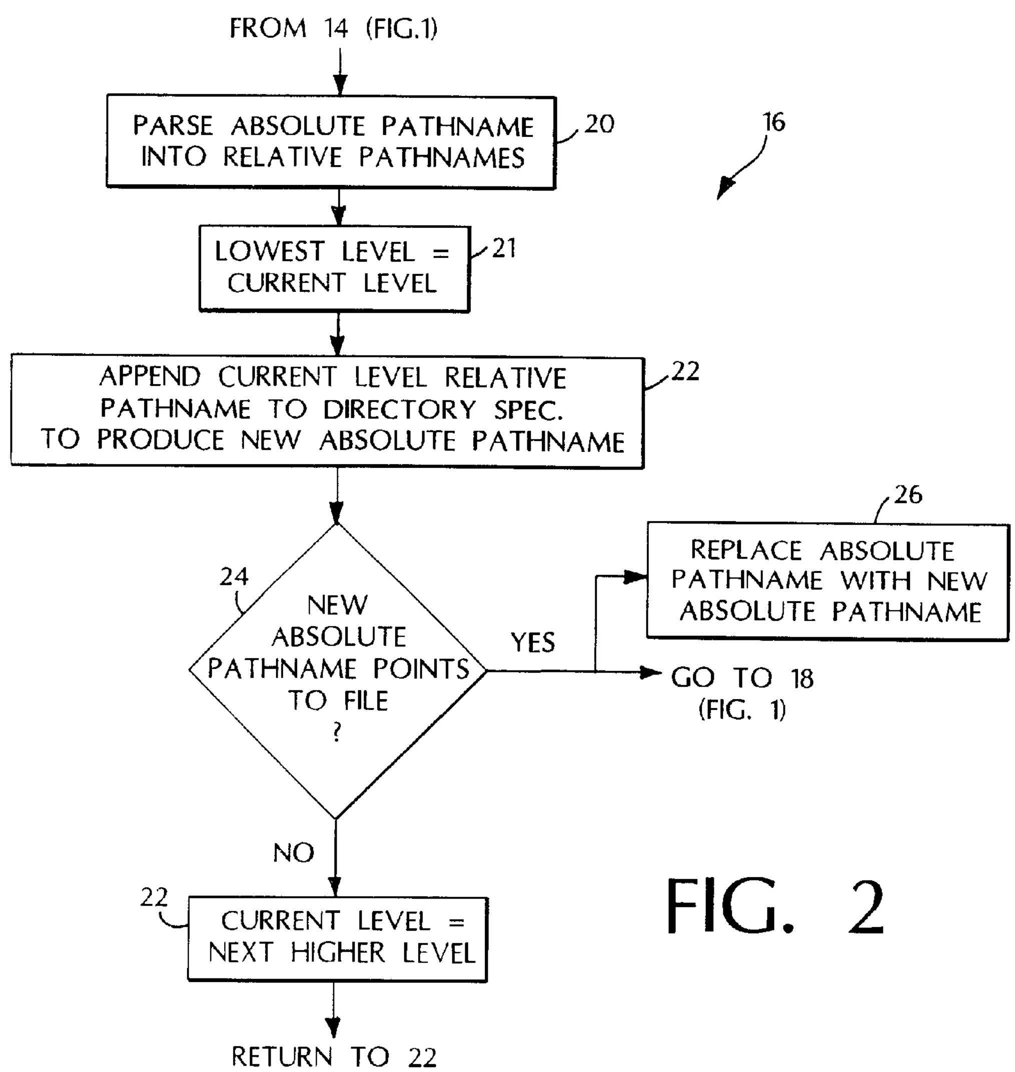
FIG. 2 is a flow diagram of the process for constructing a new absolute pathname shown in FIG. 1.

Referring to FIG. 2, the step or process of constructing a new absolute pathname (step 16 of FIG. 1) is shown. The process of constructing a new absolute pathname 16 parses the absolute pathname of the linked file into portions corresponding to a filename or directories (step 20). It begins the parsing with a first portion corresponding to the filename of the linked file and works towards a last portion corresponding to the root directory. The first portion or filename corresponds to a lowest level relative pathname. The first portion taken in conjunction with the next parsed portion corresponds to a next higher level relative pathname and so on. Taking the lowest level relative pathname as the "current" relative pathname (step 21), the new absolute pathname constructing process appends the current relative pathname to the directory specification (i.e., location) of the document to produce a new absolute pathname (step 22). The process 16 determines if the resulting new absolute pathname points to the file (step 24). If the process does not find the file, it proceeds to a next higher level relative pathname and repeats the process of appending the next higher level relative pathname to the directory specification of the document (step 22) and determining if the new absolute pathname is the location at which the file is stored (step 24). It continues proceeding to a next higher-level relative pathname until the new absolute pathname corresponds to the file location. The process 16 replaces the absolute pathname with the new absolute pathname (step 26).

The directory specification for the document at the new (present) location includes, at minimum, the same directory or renamed directory containing the document. It may also include additional directories. The process assumes, however, that the document directory structure is maintained, as would be the case if the document directory and associated subdirectories were moved together from one location to another.

The process of "placing" a linked file in a document is well known, and therefore described only briefly herein. Typically, before an application such as a page layout application places text or a graphics into a document layout, the application performs certain tasks. For example, it checks the format of the file the user wishes to import and tries to import the file. It also determines the location at which the file resides—the disk and directory or directories—and records that information, along with the filename, as the absolute pathname for the file or link to that file. Usually, the application records the last modification date in the link as well. An application can then use the link to find the file.

Files are commonly copied or inserted into the document. Thus, the application will not need to link to such files each time the document is opened. However, files that are copied are also linked. The application may need the link when printing certain files, such as graphics files, because in many cases it substitutes the original graphic file for the on-screen display image to get a better quality output. The application will also use the link to determine if the copied file has been updated and replace the copied file with the updated version, if specified by the user. If a user specifies that the application perform an automatic update, the application checks whether the source file has been changed each time the document is opened. If the source file has changed, the application replaces the old version with the updated version.

The linked file cannot always be copied into the document. Perhaps the file exceeds a specified threshold size. Most CD images cannot be stored in a document as they are simply too large. Thus, in these and other situations in which the file to be imported cannot be copied into the document, the application relies on the link to the original file for file access. Consequently, the application relinks to the original file every time the document is opened.

A typical scenario for placing a file in a document is as follows. A publishing application is launched to process a document having a filename "MYDOCUMENT.INDD", the .INDD file extension being given to documents produced by InDesign(™) page layout and design software from Adobe Systems Incorporated. To import a file, such as an image or graphics file, the application user typically invokes a "place" command. The "place" command serves to select the file and place the selected file in the document. Once the file has been placed in the document, the application stores the absolute pathname associated with the file in the document. After instructing the application to save the document, the user closes the application. The document is saved at a specified location, e.g., 'C:\PUBS\MYDOCUMENT.INDD'. The stored absolute pathname of the associated file might look like, for example, 'C:\PUBS\IMAGES\TIFF\MYIMAGE.TIF'.

If, subsequent to storing 'MYDOCUMENT.INDD' in the 'PUBS' directory on the C volume (or drive), the document and its associated subdirectories and linked files—including 'MYIMAGE.TIF'—are moved to a different location, such as a different disk, and that the top-level directory 'PUBS' has been renamed 'FINISHED\DOCUMENTS'. Thus, the absolute pathname for the document MYDOCUMENT.INDD is now 'D:\FINISHED\DOCUMENTS\MYDOCUMENT.INDD'. The absolute pathname for the linked file is 'D:\FINISHED\DOCUMENTS\IMAGES\TIFF\MYIMAGE.TIF'. If an application opens the 'MYDOCUMENT.INDD' document, the application attempts to locate the image file by following the recorded absolute pathname, i.e., the original absolute pathname 'C:\PUBS\IMAGES\TIFF\MYIMAGE.TIF'. It determines that the recorded or specified pathname is no longer valid. Using the new absolute pathname constructing process 16 as described above with reference to FIG. 2, the application can construct a new absolute pathname pointing to the linked file's new location.

Figure 3:
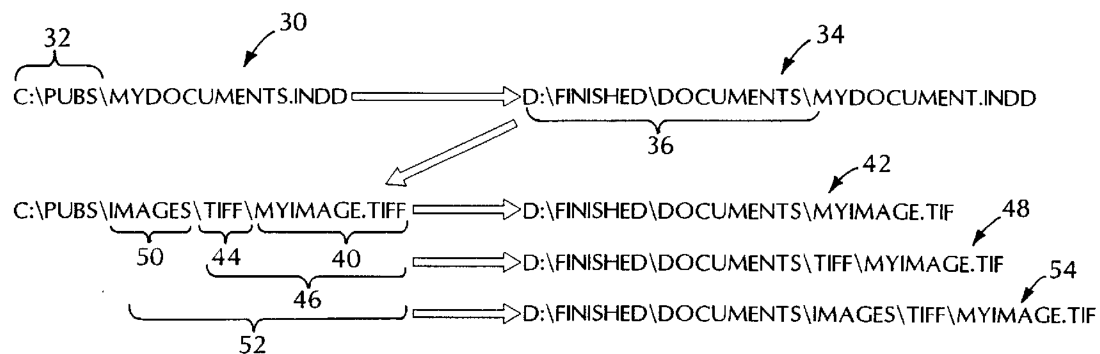
FIG. 3 is a depiction of the new absolute pathname constructing process of FIG. 2 as applied to particular linked file in a referencing document's directory structure that has been moved from one volume or disk to another.

Now referring to FIG. 3, and using the same example as above, a depiction of the process of FIG. 2 as applied to the example is shown. More particularly, the directory specification for 'MYDOCUMENT' is combined with the absolute pathname for 'MYIMAGE.TIF' in the manner described above with reference to FIG. 2.

Referring to FIG. 3, an old absolute pathname 30 for 'MYDOCUMENT.DOC' at an old location 32 and a new absolute pathname 34 for 'MYDOCUMENT.INDD' at a new location or directory specification 'D:\FINISHED\DOCUMENTS' 36 is shown. Also shown is an old absolute pathname 38 for a linked file 'MYIMAGE.TIF'. An application appends to the new directory specification 36 a filename 'MYIMAGE.TIF' 40, which it obtains by parsing the original absolute pathname 38. The application checks for the file having the filename 'MYIMAGE.TIF' at the location corresponding to the resulting new absolute pathname 'D:\FINISHED\DOCUMENTS\MYIMAGE.TIF' 42. If the file is not located there, the application appends to the directory specification 36 the filename 'MYIMAGE.TIF' 40 combined with a next higher level directory 'TIFF' 44 from the original (stored) absolute pathname, that is, a next higher level relative pathname 'TIFF\MYIMAGE.TIF' 46. Again, the application checks for the file in the location corresponding to the resulting new absolute pathname 'D:\FINISHED\DOCUMENTS\TIFF\MYIMAGE.TIF' 48. If the application determines that the file is not stored at this second location, it takes a next higher level directory 'IMAGES' 50 in conjunction with 'TIFF\MYIMAGE.TIF\' 46 as a next higher level relative pathname 'IMAGES\TIFF\MYIMAGE.TIF' 52 and appends it to the directory specification D:\FINISHED\DOCUMENTS\ 36 to give a new absolute pathname 'D:\FINISHED\DOCUMENTS\IMAGES\TIFF\MYIMAGE.TIF' 54. The application follows this pathname to locate the "missing" linked file 'MYIMAGE.TIF'.

Figure 4:
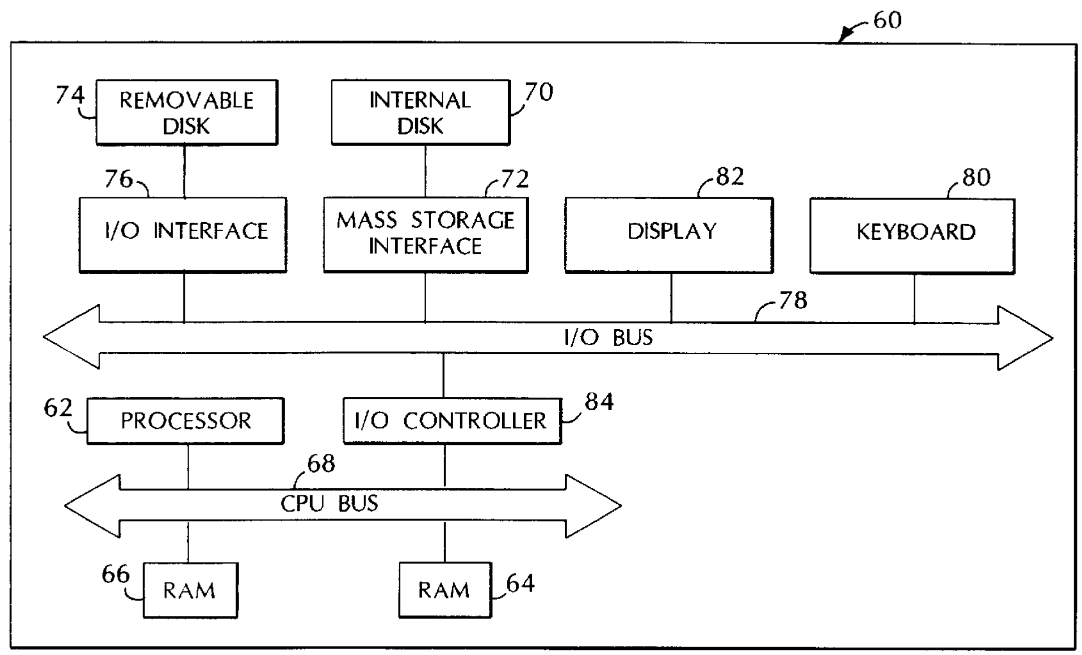
FIG. 4 is a block diagram of a computer system for supporting the link repairing process 10, as shown in FIG. 1.

Referring to FIG. 4, a computer system 60 for supporting the link detecting and repairing process 12 (of FIG. 1), as well as any other processes invoked by this process, is shown. The invention may be implemented in digital electronic circuitry or in computer system hardware, firmware, software, or in a combination of them. Apparatus of the invention may be implemented in a computer program product tangibly embodied in a machine readable storage device for execution by a computer processor 62; and method steps of the invention may be performed by the computer processor 62 executing a program to perform functions of the invention by operating on input data and generating output.

Suitable processors include, by way of example, both general and special purpose microprocessors. Generally, the processor 62 will receive instructions and data from a read-only memory (ROM) and/or random access memory (RAM) 66 through a CPU bus 68. A computer can generally also receive programs and data from a storage medium such as an internal disk 70 operating through a mass storage interface 72 or a removable disk 74 operating through an I/O interface 76. The flow of data over an I/O bus 78 to and from I/O devices 70, 74, 80, 82 and the processor 62 and memory 64, 66 is controlled by an I/O controller 84. User input is obtained through a keyboard 80, mouse, stylus, microphone, trackball, touch-sensitive screen, or other input device. These elements will be found in a conventional desktop computer as well as other computers suitable for executing computer programs implementing the methods described here, which may be used in conjunction with any display device 82, or other raster output device capable of producing color or gray scale pixels on paper, film, display screen, or other output medium.

Storage devices suitable for tangibly embodying computer program instructions include all forms of non-volatile memory, including by way of example semiconductor memory devices, such as EPROM, EEPROM, and flash memory devices; magnetic disks such as internal hard disks 110 and removable disks 74; magneto-optical disks; and CD-ROM disks. Any of the foregoing may be supplemented by, or incorporated in, specially designed ASICs (application-specific integrated circuits).

Typically, the link detecting and repairing process 10 (of FIG. 1) is a component of an electronic document publishing application, e.g., a page layout program, residing on the internal disk 70. This process is executed by the processor 62 in response to a user request to the computer system's operating system (not shown) after being loaded into memory. A document processed by this process may be retrieved from a mass storage device such as the internal disk 70 or other local memory, such as RAM 76 or ROM 64. It is also possible that the document could reside on and thus be retrieved from another computer system.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of locating a linked file, the method comprising:

retrieving a reference to a linked file linked to a document, the reference specifying an original absolute pathname;

parsing the absolute pathname into a plurality of relative pathnames;

appending a first one of the relative pathnames to a current directory specification for the document to produce a new absolute pathname; and appending subsequent ones of the plurality of relative pathnames to the current directory specification until the new absolute pathname points to the linked file.

2. The method of claim 1, wherein the linked file resides in the same directory structure as the document to which the linked file is linked.

3. The method of claim 1, wherein the reference is stored in the document to which the linked file is linked.

4. The method of claim 3 further comprising:

replacing the original absolute pathname with the new absolute pathname.

5. A computer program product residing on a computer readable medium for locating a linked file, comprises instructions for causing a computer to:

retrieve a reference to a linked file linked to a document, the reference specifying an original absolute pathname;

parse the absolute pathname into a plurality of relative pathnames;

append a first one of the relative pathnames to a current directory specification for the document to produce a new absolute pathname; and append subsequent ones of the plurality of relative pathnames to the current directory specification until the new absolute pathname points to the linked file.

6. The computer program product of claim 5, wherein the linked file resides in the same directory structure as the document to which the linked file is linked.

7. The computer program product of claim 5, wherein the instructions to retrieve a reference comprise instructions to:

retrieve the reference from the document to which the linked file is linked.

8. The computer program product of claim 7, further comprising instructions to:

replace the original absolute pathname with the new absolute pathname.

* * * * *